US007025087B2

(12) United States Patent
Weinberger et al.

(10) Patent No.: US 7,025,087 B2
(45) Date of Patent: Apr. 11, 2006

(54) RECIPROCATING PISTON PUMP ADJUSTABLE INLET BALL TRAVEL

(75) Inventors: Mark T. Weinberger, Mounds View, MN (US); Michael J. Sebion, Apple Valley, MN (US)

(73) Assignee: Graco Minnesota Inc., Minneapolis, MN (US)

( * ) Notice: Subject to any disclaimer, the term of this patent is extended or adjusted under 35 U.S.C. 154(b) by 284 days.

(21) Appl. No.: 10/481,109

(22) PCT Filed: Jun. 13, 2002

(86) PCT No.: PCT/US02/18887

§ 371 (c)(1),
(2), (4) Date: Dec. 17, 2003

(87) PCT Pub. No.: WO03/001095

PCT Pub. Date: Jan. 3, 2003

(65) Prior Publication Data

US 2004/0206402 A1    Oct. 21, 2004

Related U.S. Application Data

(60) Provisional application No. 60/299,825, filed on Jun. 21, 2001.

(51) Int. Cl.
  *F16K 15/04* (2006.01)
  *F16K 21/08* (2006.01)
  *F16K 51/00* (2006.01)

(52) U.S. Cl. .................. 137/533.11; 137/271; 251/285
(58) Field of Classification Search ........... 137/533.11, 137/269, 270, 271; 251/285
  See application file for complete search history.

(56) References Cited

U.S. PATENT DOCUMENTS

| 4,301,825 A | * | 11/1981 | Simko ..................... 137/111 |
| 4,684,334 A | * | 8/1987 | Gargas .................. 137/533.13 |
| 6,123,102 A | * | 9/2000 | Loegel, Sr. ............ 137/533.11 |
| 6,135,325 A | * | 10/2000 | Fessel et al. ................ 222/309 |

* cited by examiner

*Primary Examiner*—John Rivell
(74) *Attorney, Agent, or Firm*—Douglas B. Farrow

(57) ABSTRACT

A ball stop valve (10) allows liquid to enter a reciprocating piston pump when internal suction is great enough to raise the ball (13) and create a space between the ball (13) and a seat (9). This invention allows the user to easily insert or remove rings (15) into the ball inlet valve, either above or below the ball (13), so that the space between the ball (13) and the seat (9) can be adjusted. The valve (10) is easily accessible to the user and all components of the ball valve (10) are removable.

1 Claim, 1 Drawing Sheet

RECIPROCATING PISTON PUMP ADJUSTABLE INLET BALL TRAVEL

TECHNICAL FIELD

This application is 371 of PCT/US02/18897 filed Jun. 13, 2002 which claims benefit of U.S. application Ser. No. 6,0299,825 filed Jun. 21, 2001.

BACKGROUND ART

In pumping with liquids of varying viscosity with reciprocating piston pumps, it was found that the higher the viscosity of a liquid, the more quickly that liquid could flow through a given opening. When the opening is the ball valve of a pump, and when highly viscous liquids are being pumped, internal liquid pressure increases or spikes after intake due to excess flow of liquid taken in. This is because the same size opening is used for high viscosity liquids as for low viscosity liquids, which do not create a pressure spike. This increase in internal liquid pressure requires more energy to compensate for the pressure fluctuation, and thus decreases overall efficiency.

DISCLOSURE OF THE INVENTION

This invention allows the user to adjust the ball travel within a pump to more accurately accommodate higher or lower viscosity liquids. If the user is able to decrease the size of the opening, less liquid will enter the system and highly viscous liquids will no longer create a pressure spike. However, if low viscosity liquids are being pumped a larger opening is required in order to avoid excess energy being expended to increase suction. This invention simply allows the user to adjust the maximum size of the opening during intake to match the viscosity of the liquid being pumped, thus, if used correctly, increasing efficiency.

The ball acts as a stopper to some degree in maintaining proper liquid pressure within the pump, allowing some liquid into the system only when the internal suction is great enough to raise the ball. In pumping liquids of varying viscosity a varying size opening is preferable to maintain constant internal pressure. The higher the viscosity of a liquid, the smaller the opening preferred to allow some liquid into the system while maintaining internal pressure. This invention simply allows the user to insert ball travel spacers either above or below the ball, which will increase or decrease the opening the liquid must travel through.

These and other objects and advantages of the invention will appear more fully from the following description made in conjunction with the accompanying drawings wherein like reference characters refer to the same or similar parts throughout the several views.

BEST MODE FOR CARRYING OUT THE INVENTION

Figure 1:
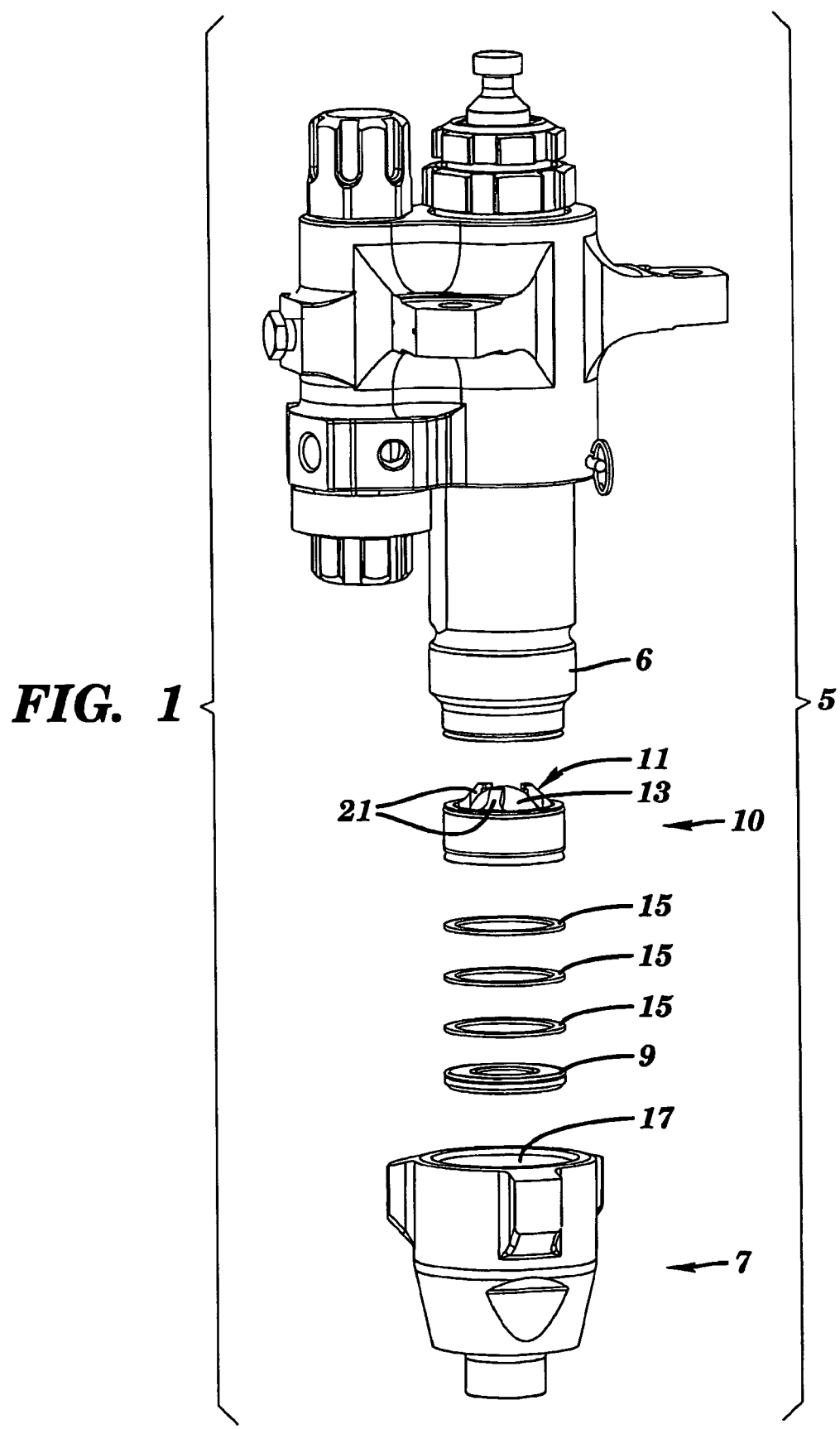
FIG. 1 is an exploded view of the pump showing the intake check valve system.

This invention allows the user to adjust the ball travel within a pump to more accurately accommodate higher or lower viscosity liquids. Liquids being pumped into the system enter the pump through the lower housing 7 and cavity 17 therein. Such liquids rise due to internal suction until they reach the check valve 10. The liquids may enter the pump only if the ball 13 is raised and not snugly fit into the seat 9, as that creates an effective plug. When internal suction is great enough to raise the ball 13 so it no longer is snugly fit into the seat 9, liquid may pass through the seat 9 and upwards into the pump cylinder 6. The ball 13 is prevented from travelling into the cylinder 6 by a ball stop 11, which is a ring that extends arms 21 across the cavity such that the ball may not pass through but does not impede the flow of liquid.

The invention embodied herein is the addition of adjustable shims 15 in the form of rings, and which can be placed above or below check valve 10 so that the space between the seat 9 and the ball 13 while liquid is flowing through can be adjusted and controlled. If the shims 15 are inserted below check valve 10, the ball 13 has a full range of travel between the seat 9 and the ball stop arms 21. If shims 15 are added above check valve 10, less space is allowed between the ball stop arms 21 and the seat 9, thus decreasing the amount of liquid that will enter the system 5 at a time.

It is contemplated that various changes and modifications may be made to the adjustable inlet ball travel without departing from the spirit and scope of the invention as defined by the following claims.

The invention claimed is:

1. A reciprocating piston pump system having a cylinder, a lower check valve housing removably attached to said cylinder and forming a check valve cavity therein, said check valve cavity having a cross-section and a check valve assembly in said check valve cavity, said check valve assembly comprising:
   a ball stop guide having first and second ends;
   a ball seat;
   a check ball; and
   a plurality of shims shaped to fit in said cross-section and locatable adjacent at least one of said ends to control the distance between said ball stop guide and said valve seat.

* * * * *